US006406670B1

(12) United States Patent
Earley et al.

(10) Patent No.: US 6,406,670 B1
(45) Date of Patent: Jun. 18, 2002

(54) MULTIPLE WELL MICROTITER PLATE LOADING ASSEMBLY AND METHOD

(75) Inventors: William G. Earley, East Greenbush; Brian T. Gregg, Voorheesville; Richard G. Pierce, Sr., Albany, all of NY (US)

(73) Assignee: Albany Molecular Research, Inc., Albany, NY (US)

( * ) Notice: Subject to any disclaimer, the term of this patent is extended or adjusted under 35 U.S.C. 154(b) by 6 days.

(21) Appl. No.: 09/645,529

(22) Filed: Aug. 25, 2000

(51) Int. Cl.[7] .............................. B01L 3/00; B01L 3/02; B60P 1/00; B67D 5/64; B65B 1/04; B65B 3/04; B65B 39/00; B65B 5/00

(52) U.S. Cl. ..................... 422/99; 422/100; 422/102; 414/403; 414/405; 53/258; 53/248; 53/247; 222/174; 222/180

(58) Field of Search ................... 422/99, 100, 102; 414/675, 405, 403; 53/258, 234, 246, 247; 222/174, 168, 180

(56) References Cited

U.S. PATENT DOCUMENTS

| | | | | |
|---|---|---|---|---|
| 3,518,752 A | * | 7/1970 | Lentz | |
| 4,101,284 A | * | 7/1978 | Difiglio et al. | |
| 5,766,556 A | * | 6/1998 | DeWitt et al. | |
| 5,935,859 A | * | 8/1999 | Elliott et al. | |
| 5,943,842 A | * | 8/1999 | de Koning et al. | |
| 6,197,261 B1 | * | 3/2001 | Linville et al. | |
| 6,258,324 B1 | * | 7/2001 | Yiu | |
| 6,274,088 B1 | * | 8/2001 | Burbaum et al. | |

* cited by examiner

Primary Examiner—Jeffrey Snay
Assistant Examiner—Brian R. Gordon
(74) Attorney, Agent, or Firm—Nixon Peabody LL); Thomas W. Cole

(57) ABSTRACT

An apparatus and method for simultaneously loading a plurality of small items such as small items into the wells of a multiple well microtiter plate which includes a small item loading unit and a small item insertion device. The small item loading device includes a top plate having a plurality of openings positioned to register with the microtiter plate wells and a closure unit to close the openings on one side of the top plate. The small item insertion device includes a base mounting a plurality of plunger pins which each register with a well in the microtiter plate. A movable deck unit is mounted in spaced relationship above the base and is provided with apertures, each of which receives a plunger pin. The small item loading device rests on the deck unit and the closure unit opens the openings therein to drop small items into the apertures over the pins. The deck unit is moved toward the base to cause the pins to enter the wells of a microtiter plate and seat the small items.

10 Claims, 3 Drawing Sheets

MULTIPLE WELL MICROTITER PLATE LOADING ASSEMBLY AND METHOD

BACKGROUND OF THE INVENTION

In the past, the insertion of small items into wells of various shapes formed in a plate has been a tedious and time consuming task. This has been particularly true when appropriately sized small items, such as porous polypropylene frits or other small items of composite material, were inserted into the multiple wells of a microtiter polypropylene plate such as a 1 mL 96 well microtiter plate. Such insertion has involved a manual technique wherein each item is individually placed into an empty well of the microtiter plate and is then manually seated in the well using a hand-held 5 mm rod.

SUMMARY OF THE INVENTION

It is a primary object of the present invention to provide a novel and improved multiple well microtiter plate loading assembly and method wherein a plurality of frits or similar small items are seated in wells in a receiving plate in a single operation.

Another object of the present invention is to provide a novel and improved multiple well microtiter plate loading assembly and method which includes a frit loading unit and a frit insertion device. The frit loading unit is designed to rapidly load a plurality of frits or other small items into apertures in the frit insertion device which includes a plurality of insertion pins to insert the frits simultaneously into the wells of a multiple well microtiter.

A further object of the present invention is to provide a novel and improved method for simultaneously loading a plurality of small items into the wells of a multiple well microtiter plate which includes providing a microtiter support unit with a plurality of frit receiving apertures extending therethrough which are arranged to correspond in position to the position of the wells in the microtiter plate. An elongate plunger pin is inserted into each of the apertures and a frit is loaded into each aperture to rest on the plunger pin. A microtiter plate is then inverted on the microtiter support unit with the wells aligned with the apertures, and the plunger pins are moved into the wells to seat the frits in the wells.

A still further object of the present invention is to provide a novel and improved apparatus for simultaneously loading a plurality of frits or similar small items into the wells of a multiple well microtiter plate which includes a frit insertion device including a base upon which a plurality of plunger pins are mounted so that each plunger pin registers with a well in the microtiter plate. A deck unit is movably mounted in spaced relationship to the base and includes a plurality of apertures extending therethrough, each of which receives a pin. A frit is placed on each pin within the apertures and the deck unit is movable toward the base to cause the pins to extend into the wells of a microtiter plate seated on the deck unit to seat a frit in each well.

DESCRIPTION OF THE PREFERRED EMBODIMENT

The multiple well microtiter small item loading assembly and method of the present invention will be described, for purposes of illustration, in connection with a microtiter well plate having 96 tubular wells for receiving small items of composite material or other small items such as circular polypropylene frits. It should be understood that other multiple well devices having more or less than 96 wells of various shapes other than circular can be loaded using the device and method of the invention. For purposes of this application, the small items to be loaded will be described as circular polypropylene frits, it being understood that other small items of various material and conforming shapes, such as composite material items, can be loaded in the manner to be described.

Figure 1:
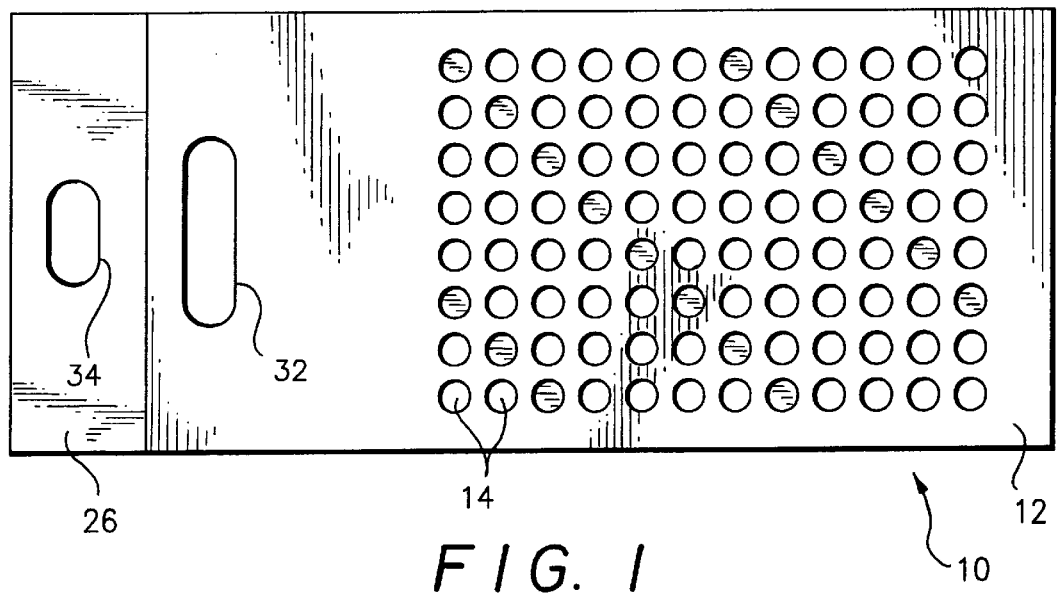
FIG. 1 is a plan view of the frit loading unit for the multiple well microtiter plate loading device of the present invention.
Figure 2:
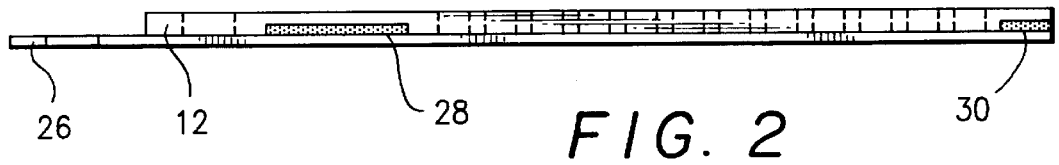
FIG. 2 is a view in side elevation of the frit loading device of FIG. 1.
Figure 3:
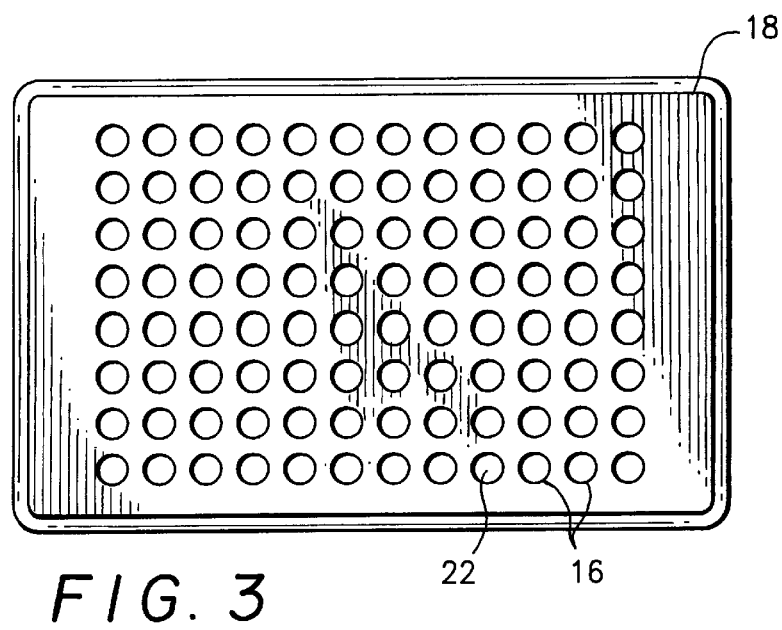
FIG. 3 is a plan view of a multiple well microtiter plate.
Figure 4:
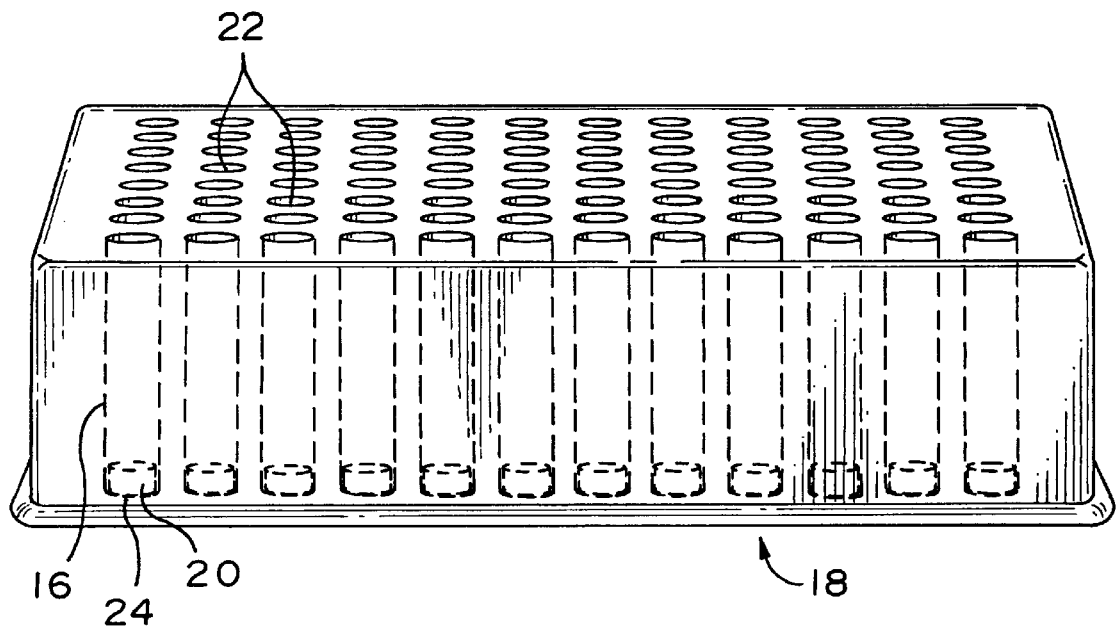
FIG. 4 is a perspective view of the microtiter plate of FIG. 3.

The multiple well microtiter plate loading assembly of the present invention includes two primary components; namely a frit loading unit and a frit insertion device. With reference to FIGS. 1 and 2, the frit loading unit indicated generally at 10 includes a flat top plate 12 having a plurality of spaced, frit receiving apertures 14 extending through the top plate. These apertures are shaped and located to correspond to the shape and location of the open ends of wells 16 in a multiple well microtiter plate 18, such as the Beckman microtiter plate shown in FIGS. 3 and 4. The wells 16 have a substantial depth, as shown in FIG. 4, and it is important to fully insert each frit 20 through the well opening 22 and down towards the bottom surface 24 of a receiving well such that the frits are not able to be dislodged.

The frit loading unit 10 also includes a flat bottom slider plate 26 which is no greater in width than the top plate 12 but is preferably longer than the top plate. The flat bottom plate 26 is formed to close the apertures 14 when brought into flush engagement with a flat surface of the top plate. The top and bottom plates are relatively movable, but are temporarily held together, preferably by magnetic attraction. To accomplish this, one plate is provided with attached magnetic units while the remaining plate is provided with areas which are subject to magnetic attraction by the magnetic units. As shown in by FIG. 2, the top plate 12 can include a plurality of magnetic strips 28 and 30 to attract the bottom plate 26 which is formed of steel or other metal subject to magnetic attraction. Obviously, the attracting magnets could be formed on the bottom plate to attract the top plate when the two plates are brought together.

The magnetic strips 28 and 30 are of sufficient size and magnetic strength to affix the top and bottom plates together. To aid in overcoming this magnetic attraction and facilitate sliding the bottom plate away from the top plate to open the apertures 14, the top and bottom plates are provided with cut-out portions 32 and 34 respectively which may be manually gripped to achieve relative sliding movement between the plates.

To use the frit loading unit 10, the flat bottom slider plate 26 is engaged in flush alignment with the top plate 12 as shown in FIGS. 1 and 2 so that all of the apertures 14 are closed by the bottom plate. Then a frit 20 is loaded into each of the apertures 14 either manually or by dipping the frit loading unit into a bin containing multiple frits. The depth of the apertures 14 is such that a frit seated in each aperture has a top surface which is level with the top surface of the top plate 12. Multiple frits can be piled on the top plate and rapidly inserted in the apertures 14 by spreading the frits across the top surface of the top plate. Once all apertures 14 are filled, excess frits can be removed.

Figure 5:
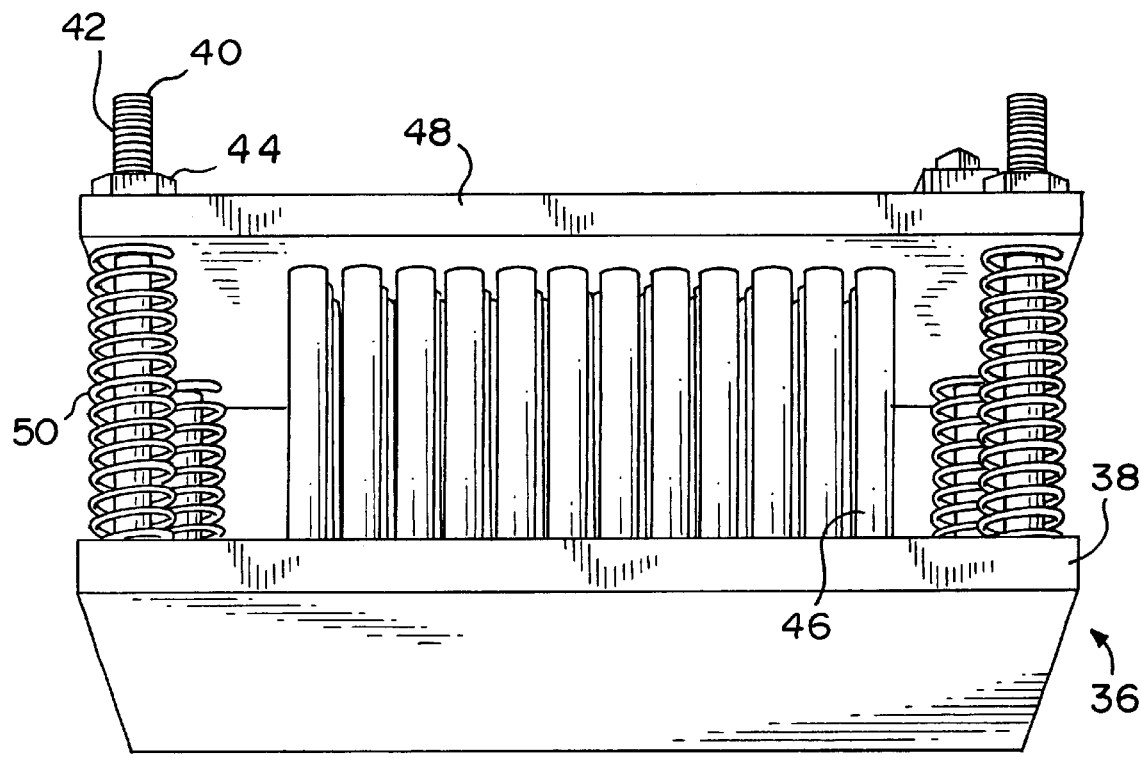
FIG. 5 is a perspective view of the frit insertion device for the multiple well microtiter plate loading device of the present invention.
Figure 6:
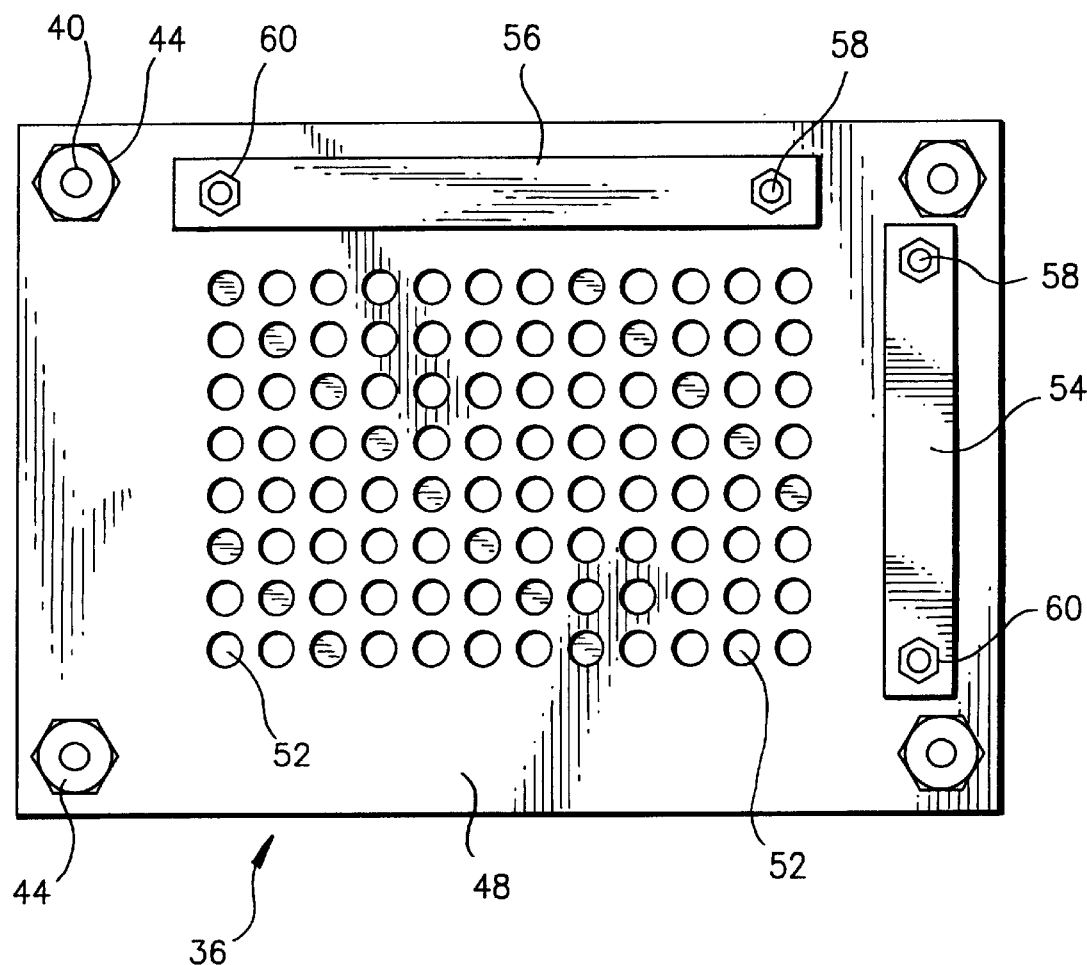
FIG. 6 is a plan view of the frit insertion device of FIG. 5.

Referring to FIGS. 5 and 6, the frit insertion device indicated generally at 36 includes a base plate 38 having four spaced, upwardly projecting support pins 40 secured with two at each end adjacent to the corners thereof. Each support pin is threaded at 42 to receive an adjustment nut 44. Spaced inwardly from the support pins 40 and projecting upwardly from the base plate 38 are a plurality of spaced alignment pins 46. The base plate 38 is provided with a plurality of spaced, internally threaded holes which extend inwardly from the top surface of the base plate and are located to correspond to the location of the wells 16 in the multiple well microtiter plate 18. Each of the spaced alignment pins 46 is threaded at the bottom so that the pin can be threaded into an internally threaded hole in the base plate 38. Thus alignment pins can be removed from the base plate and replaced with alignment pins of a different length. The length and shape of each alignment pin is such that the pin will slide into a well 16 and seat a frit 20 at the bottom of the well when the frit insertion device 36 is used. Typically, for many microtiter plates, tapered alignment pins between two and three inches in length are sufficient.

Mounted on the support pins 40 above the base plate 38 is a deck plate 48 having openings at the corners of each end through which the support pins 40 extend. The deck plate can move along the support pins toward and away from the base plate 38, but is normally maintained in spaced relationship above the base plate by springs 50 which surround the support pins. These springs engage the upper surface of the base plate and the lower surface of the deck plate to bias them apart. The normal position of the deck plate relative to the base plate can be adjusted by adjusting the nuts 44 which engage the top surface of the deck plate.

Extending through the deck plate 48 are a plurality of frit receiving apertures 52 which correspond in shape and location to the wells 16 and the frit receiving apertures 14 in the top plate 12 of the frit loading unit 10. The deck plate is adjusted relative to the base plate 38 so that an alignment pin 46 projects into each of the frit receiving apertures 52 but terminates at a short distance from the top surface of the deck plate so that a frit 20 can be received in each frit receiving aperture 52 and rest on the end of an alignment pin.

Adjustably secured to the top surface of the deck plate 48 are elongate alignment guides 54 and 56 which may be moved toward and away from the frit receiving apertures 52. These elongate alignment guides are secured in place to the deck plate 48 by threaded bolts 58 which extend through slots in the deck plate and the alignment guides and are held in place by nuts 60. The bolts move in the slots in the deck plate to facilitate adjustment of the alignment guides 54 and 56.

In the operation of the multiple well microtiter frit loading assembly of the present invention, the frit loading unit 10 is first loaded with frits 20 in the manner previously described. Then the loaded frit loading assembly is placed onto the upper surface of the deck plate 48 with the flat bottom slider plate 26 in engagement with the deck plate. The frit loading assembly is moved into engagement with the elongate alignment guides 54 and 56 which have previously been positioned to align the frit receiving apertures 52 with the frit receiving apertures 14 when the frit loading assembly engages the elongate alignment guides. Now, while the flat top plate 12 is held in place, the flat bottom slider plate is slid outwardly away from the alignment guide 54 to permit the frits from the frit receiving apertures 14 to drop through into the frit receiving apertures 52. The frits now rest on the ends of the alignment pins 46 which have been adjusted so that the frits project slightly upward from the top surface of the deck plate 48. Once the frits are loaded into the deck plate, the frit loading unit 10 is removed and the multiple well microtiter plate 18 is inverted and brought down over the deck plate with the open ends of the wells 16 over the frits 20 in frit receiving apertures 52. Since the frits 20 project slightly above the surface of the deck plate, they may be used to align the microtiter plate 18 so that each well 16 is positioned to receive a frit. With the microtiter plate 18 inverted in place, it is then forced downwardly against the deck plate 48 to move the deck plate downwardly toward the base plate 38 compressing the springs 50. This causes the alignment pins to enter the wells 16 inserting the frits on the ends of the alignment pins into the wells. When the frits are positioned in the wells 16, the downward pressure on the microtiter is released causing the springs 50 to expand and return the deck plate to its original position. This results in withdrawal of the alignment pins from the wells 16, and the microtiter plate 18 with the frits in place may now be removed from the deck plate. Before the microtiter is forced downwardly to lower the deck plate, a plate may be placed on the exposed surface of the microtiter plate 18 to prevent damage as it is forced downwardly against the bias of the springs 50.

Alternatively, it is sometimes possible to form the top plate 12 to correspond with the size of the microtiter plate 18 so that the microtiter plate can be inverted over the top plate without removing the top plate from the deck plate 48. The elongate alignment guides 54 and 56 would then be used to position the microtiter and the alignment pins 46 would pass through the top plate 12 into the wells 16.

We claim:

1. An apparatus for simultaneously loading a plurality of small items into the wells of a multiple well microtiter plate, each of said wells having an open end to receive a small item, comprising:

a small item insertion device including a base;

a plurality of elongated plunger pins mounted on said base, each of said plunger pins including a pin base end secured to said base and a pin free end spaced above said base;

a deck plate mounted in spaced relationship above said base to receive said microtiter plate with the open ends of said wells adjacent to said deck plate, said deck plate including a plurality of apertures each for receiving the pin free end of one of said elongated plunger pins and a small item resting on the free end of said plunger pin, and a deck plate mount secured to said base plate and engaging said deck plate to mount said deck plate in spaced relation above said base plate with the free pin end of each of said elongated plunger pins received in an aperture in said deck plate, said deck plate mount operating to permit movement of said deck plate toward said base plate whereby small items loaded into said deck plate apertures are inserted by said elongated plunger pins into the wells of a microtiter plate resting on said deck plate.

2. The apparatus for loading small items as described in claim 1 further comprising a small item loading unit for loading small items into said deck plate apertures which includes a top plate having a plurality of openings therethrough registrable with said deck plate apertures for receiving said small items, and a bottom plate slidably movable with respect to said top plate for releasing said small items from said openings in said top plate when said top and bottom plates are positioned over said deck plate with said top plate openings in registration with said deck plate apertures.

3. The apparatus for loading as described in claim 1, wherein said deck plate is mounted for reciprocal movement with respect to said base plate.

4. The apparatus for loading as described in claim 3, wherein said deck plate mount includes at least one resilient element for biasing said deck plate away from said base plate.

5. The apparatus for loading as described in claim 2, wherein said bottom plate is secured to said top plate for sliding movement relate thereto.

6. The apparatus for loading as described in claim 2, wherein said deck plate includes an adjustable alignment mechanism for aligning the apertures of said deck plate with the openings of said top plate when said top and bottom plates are positioned on said deck plate.

7. The apparatus for loading as described in claim 6, wherein said alignment mechanism includes a pair of adjustable guide bars for engaging different sides of said small item loading unit.

8. The apparatus for loading as described in claim 1, wherein each of said plunger pins includes a threaded end engageable with a threaded bore in said base plate for mounting and adjusting the height of said pin.

9. The apparatus for loading as described in claim 1, wherein said deck plate mount includes a plurality of rods for movably mounting said deck plate over said base and a spring mounted on each of said rods.

10. The apparatus for loading as described in claim 5, wherein a magnet is mounted on one of said top and bottom plates to hold said plates together but to permit said bottom plate to slide relative to said top plate.

* * * * *